(12) United States Patent
Kalm et al.

(10) Patent No.: US 8,096,410 B2
(45) Date of Patent: Jan. 17, 2012

(54) ADJUSTABLE ITEM TRANSPORT

(75) Inventors: W. Scott Kalm, Sarasota, FL (US);
Nathan Johnson, Clearwater, FL (US)

(73) Assignee: Pitney Bowes Inc., Stamford, CT (US)

( * ) Notice: Subject to any disclaimer, the term of this patent is extended or adjusted under 35 U.S.C. 154(b) by 244 days.

(21) Appl. No.: 12/334,812

(22) Filed: Dec. 15, 2008

(65) Prior Publication Data
US 2010/0147655 A1 Jun. 17, 2010

(51) Int. Cl.
*B65G 39/16* (2006.01)
(52) U.S. Cl. ........................................ 198/840; 198/841
(58) Field of Classification Search .................. 198/840, 198/841, 831
See application file for complete search history.

(56) References Cited

U.S. PATENT DOCUMENTS

| | | | | |
|---|---|---|---|---|
| 2,822,003 A * | 2/1958 | McCahon et al. | ....... | 144/250.18 |
| 3,164,247 A * | 1/1965 | Hall | .............................. | 198/806 |
| 3,658,170 A * | 4/1972 | Wilson | ..................... | 198/867.11 |
| 3,703,626 A * | 11/1972 | Shanrock | ...................... | 235/480 |
| 3,880,274 A * | 4/1975 | Bechtloff et al. | .......... | 198/626.2 |
| 4,181,214 A * | 1/1980 | Szasz et al. | ................. | 198/463.3 |
| 4,225,036 A * | 9/1980 | Michael | ........................ | 198/840 |
| 4,601,685 A * | 7/1986 | Delhaes | ......................... | 474/188 |
| 4,685,553 A * | 8/1987 | Jennings | ....................... | 198/405 |
| 5,158,171 A * | 10/1992 | Graff | ............................. | 198/848 |
| 6,186,732 B1 * | 2/2001 | Brown et al. | ................. | 414/528 |
| 6,343,489 B1 * | 2/2002 | Smith | ............................. | 65/286 |
| 6,488,141 B2 * | 12/2002 | Pritchard et al. | .............. | 198/446 |
| 6,871,737 B2 * | 3/2005 | Ertel et al. | ................. | 198/860.1 |
| 6,971,509 B2 * | 12/2005 | Ertel et al. | .................... | 198/813 |
| 7,011,208 B2 * | 3/2006 | Nakashima | ................... | 198/840 |
| 7,650,729 B2 * | 1/2010 | Whittlesey | ................... | 53/138.2 |
| 7,832,549 B2 * | 11/2010 | Honeycutt | .................... | 198/831 |
| 2001/0022261 A1* | 9/2001 | Pritchard et al. | ............. | 198/579 |
| 2005/0145465 A1* | 7/2005 | Ertel et al. | ................. | 198/860.1 |
| 2008/0060916 A1* | 3/2008 | Whittlesey | .................... | 198/812 |

* cited by examiner

*Primary Examiner* — Joseph A Dillon, Jr.
(74) *Attorney, Agent, or Firm* — Brian A. Collins; Charles R. Malandra, Jr.; Steven J. Shapiro

(57) ABSTRACT

An adjustable item transport includes a deck for supporting items, a transport element for transporting the items along the deck on a transport path, a plurality of support elements rotatably supporting the transport element, and an adjustment member. Each support element may include a plurality of recesses configured to receive the transport element. Each recess corresponds to an operating position of the transport element. The adjustment member may include a handle portion, a first guide portion adjacent to a first edge of the transport element, and a second guide portion adjacent to a second edge of the transport element. Movement of the handle portion substantially perpendicular to the transport path engages one of the first guide portion and the second guide portion with a respective edge of the transport element to move the transport element between recesses in the support element to change the operating position of the transport element.

12 Claims, 5 Drawing Sheets

ADJUSTABLE ITEM TRANSPORT

FIELD OF THE INVENTION

The present invention relates to a system for transporting items and, more particularly, to an adjustable item transport.

BACKGROUND OF THE INVENTION

Item transport systems, such as mailpiece handling systems, for example, are known in the art. These systems include inserter systems, which create mailpieces and prepare them for mailing, as well as sortation systems, which sort completed mailpieces and direct the mailpieces to storage pockets or bins, depending on the system's configuration. Other types of transport systems and related applications are known.

In some mailpiece handling systems, mailpieces are transported using belts or chain drives between stations where they undergo various types of processing. The processing may include cutting, folding, scanning, weighing, printing, and labeling, for example.

Some systems are configured to process mailpieces of different sizes and/or different types. In one example, a mailpiece handling system may be configured to process envelopes of different sizes. Other systems may be configured to process different types of mailpieces, such as envelopes, postcards, magazines, and catalogs, for example.

A different arrangement of drive elements, such as belts, for example, may be required for mailpieces of different sizes or for mailpieces of comparable size having different wrapping materials. In one example, a postcard requires more closely spaced drive elements than a large envelope. In another example, mailpieces covered with a thin polymer wrapping may require a different spacing of drive elements than similar mailpieces wrapped in stiff cardboard.

SUMMARY OF EXEMPLARY ASPECTS

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

In accordance with the purpose of the invention, as embodied and broadly described herein, one aspect of the invention relates to a system comprising an adjustable item transport comprising a deck for supporting items, a transport element for transporting the items along the deck on a transport path, a plurality of support elements rotatably supporting the transport element, each support element comprising a plurality of recesses configured to receive the transport element, wherein each recess corresponds to an operating position of the transport element; and an adjustment member. The adjustment member may comprise a handle portion, a first guide portion adjacent to a first edge of the transport element, and a second guide portion adjacent to a second edge of the transport element. Movement of the handle portion substantially perpendicular to the transport path may engage one of the first guide portion and the second guide portion with a respective edge of the transport element to move the transport element between recesses in the support element to change the operating position of the transport element.

As used herein, "items" include papers, documents, postcards, envelopes, brochures, enclosures, booklets, magazines, media items, including CDs, DVDs, computer disks, and/or other digital storage media, and packages having a range of sizes and materials.

In another aspect, the invention relates to a method of adjusting an item transport comprising supporting items on a deck, transporting the items with a transport element along the deck on a transport path, rotatably supporting the transport element with a plurality of support elements, each support element comprising a plurality of recesses configured to receive the transport element, wherein each recess corresponds to an operating position of the transport element, and adjusting the operating position of the transport element with an adjustment member. The adjustment member may comprise a handle portion, a first guide portion adjacent to a first edge of the transport element, and a second guide portion adjacent to a second edge of the transport element. Adjusting the operating position may comprise moving the handle portion substantially perpendicularly to the transport path to engage one of the first guide portion and the second guide portion with a respective edge of the transport element to move the transport element between recesses in the support element.

In a further aspect, the invention provides an adjustable item transport comprising a deck for supporting items, a plurality of transport elements for transporting the items along the deck on a transport path, a plurality of support elements rotatably supporting each of the transport elements, each support element comprising a plurality of recesses configured to receive a respective transport element, wherein each recess corresponds to an operating position of the respective transport element; and an adjustment member associated with each of the transport elements. The adjustment member may comprise a handle portion, a first guide portion adjacent to a first edge of the respective transport element, and a second guide portion adjacent to a second edge of the respective transport element. Movement of the handle portion substantially perpendicular to the transport path may engage one of the first guide portion and the second guide portion with a respective edge of the respective transport element to move the respective transport element between recesses in the support element to change the operating position of the transport element.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

DETAILED DESCRIPTION OF EXEMPLARY EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Embodiments of the adjustable item transport according the invention will be described with reference to certain applications in mailpiece inserter systems. It should be understood, however, that the device of the invention may be used in association with other systems configured to handle and transport items.

Figure 1:
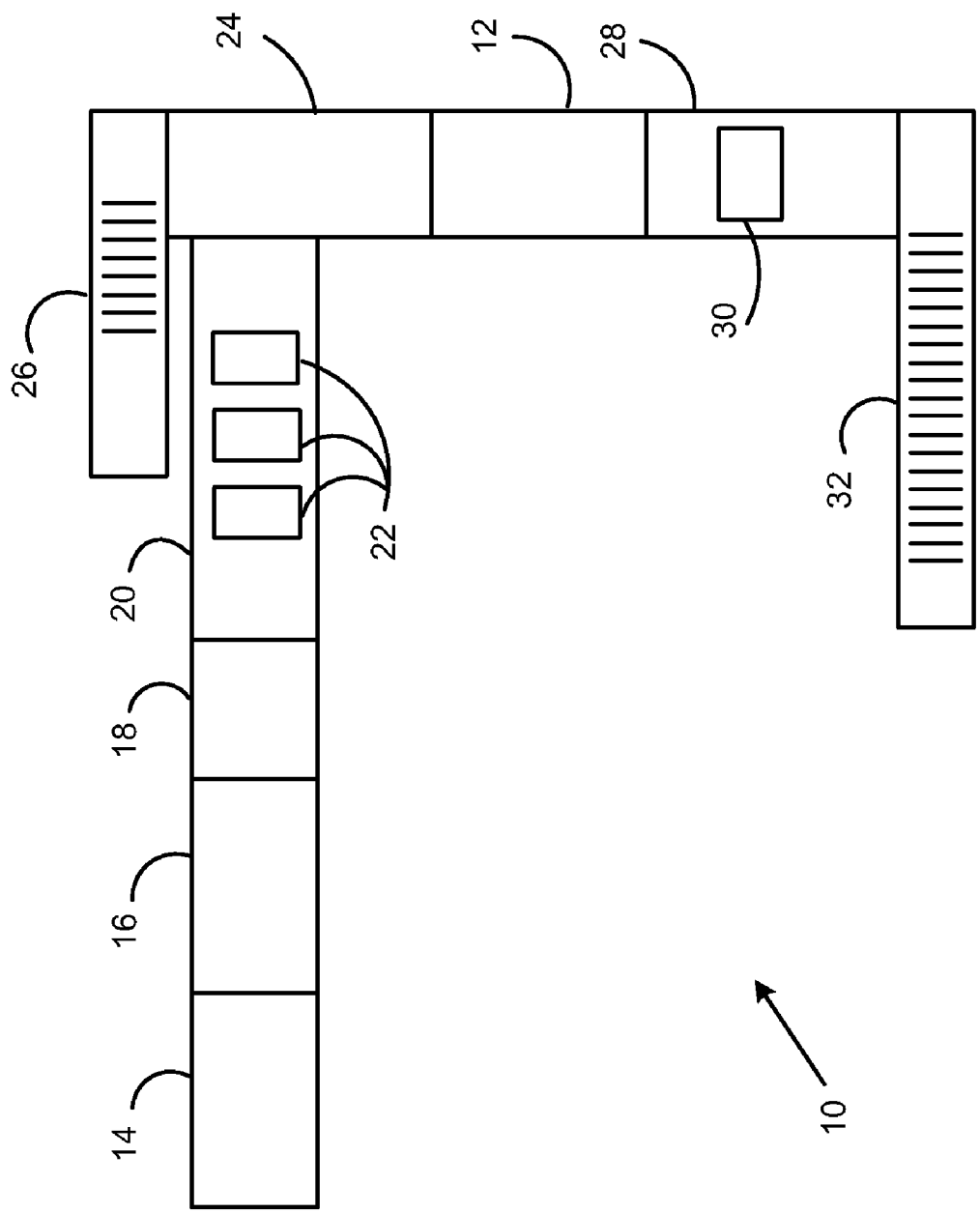
FIG. 1 is a schematic view of an inserter system utilizing an embodiment of the adjustable item transport of the present invention.

A schematic view of an inserter system 10 incorporating the adjustable item transport 12 of the invention is shown in FIG. 1. The illustrated exemplary inserter system 10 comprises a sheet feeder 14, which provides pre-printed documents for processing. The documents, which may comprise bills or financial statements, for example, may be provided by the sheet feeder 14 as individual "cut sheets," or may be cut from a spool using a web cutter (not shown).

The documents next move to an accumulator 16, where the documents for respective mailpieces are assembled and folded. The folded accumulations next move to a buffer 18, which holds the accumulations for sequential processing. The accumulations next move to a chassis 20. As each accumulation moves through the chassis, inserts from a plurality of feeder modules 22 are added to the accumulation.

The accumulations next enter an insertion area 24, where the finished accumulations are stuffed into envelopes provided by an envelope hopper 26, and the envelopes are sealed. The stuffed, sealed envelopes next pass through the adjustable item transport 12 of the invention, as discussed in more detail below.

The envelopes then enter a printing area 28, where markings, such as a postage indicia and/or address information, for example, are applied using a printer 30. Finally, the completed mailpieces are deposited on a conveyor 32.

Although the adjustable item transport 12 of the present invention is shown as an individual component in FIG. 1, features of the invention may be incorporated into other components in the illustrated inserter system 10, as well as into other systems configured to handle and transport items. In use, embodiments of the adjustable item transport 12 shown and described herein may be mounted on a base, cabinet, cart, or other suitable mounting structure.

The adjustable item transport 12 may allow an operator to safely adjust the operating position of transport elements that transport items to ensure optimum operation of the system. In addition, the transport 12 may allow an operator to adjust the position of adjustment members that guide items being transported.

Figure 2:
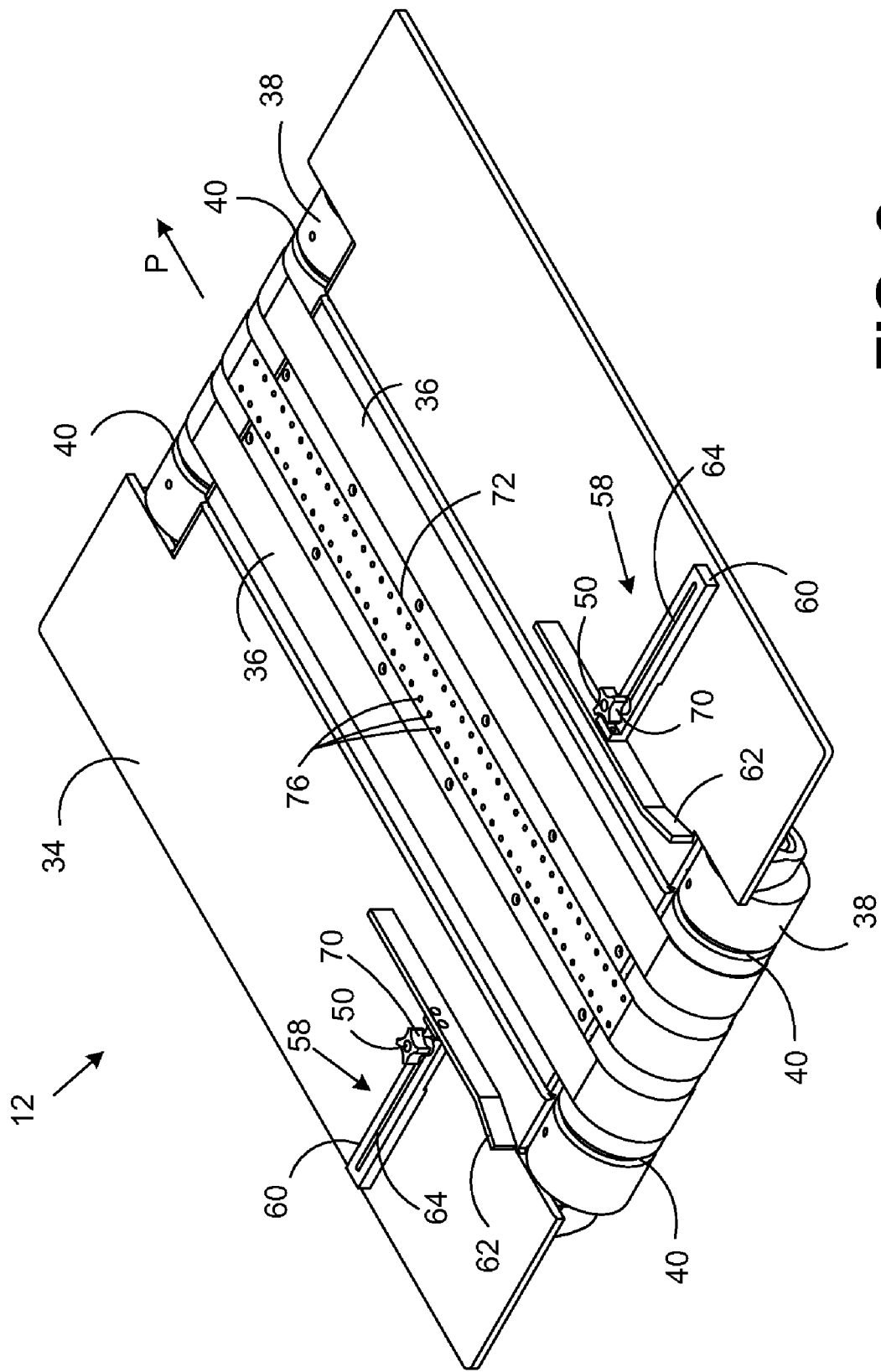
FIG. 2 is a perspective view of an embodiment of the adjustable item transport shown in FIG. 1.

An embodiment of the adjustable item transport 12 of the invention is shown in FIG. 2. The transport 12 in the illustrated embodiment comprises a deck 34 for supporting items and a transport element 36 for transporting the items along the deck 34 on a transport path P.

The transport element 36 shown in FIG. 2 comprises a smooth, elastic belt. In further embodiments, the transport element may comprise an O-ring, a toothed belt, or other drive element. The adjustable item transport 12 shown in FIG. 2 comprises two transport elements 36. Transports having more or fewer transport elements may also be used.

The adjustable item transport 12 further comprises a plurality of support elements 38 rotatably supporting the transport elements 36. The support elements 38 in the illustrated embodiment comprise smooth rollers. Other types of support elements may also be used, depending on the type of transport element used. In addition, two support elements 38 are shown, but drive arrangements utilizing other numbers of support elements may also be used. One or more of the support elements may be driven using a motor/controller drive arrangement (not shown).

Figure 3:
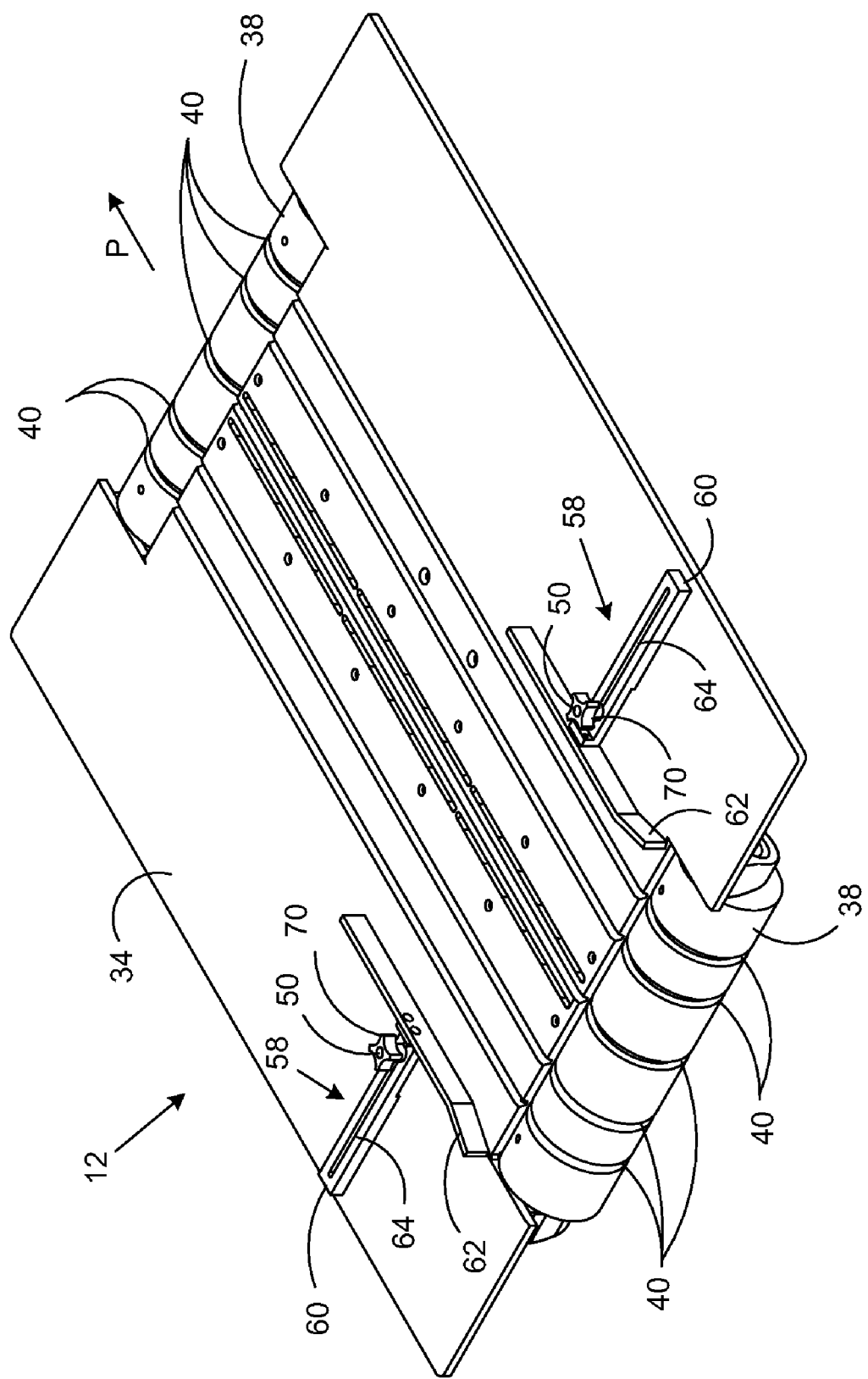
FIG. 3 is a perspective view of the adjustable item transport shown in FIG. 2 with the transport elements removed.

FIG. 3 shows an embodiment of the adjustable item transport 12 with the transport elements 36 removed to more clearly depict the support elements 38. As shown, each support element 38 comprises a plurality of recesses 40 configured to receive the transport elements 36. The size and shape of the recesses 40 may vary depending on the transport elements 36 used. In the illustrated embodiment, the recesses 40 are configured to receive a raised portion extending from an inside surface of the transport elements. In other arrangements, the recesses 40 may be configured to receive the flat portion of the transport elements 36.

The illustrated support elements 38 each comprise five recesses 40. Support elements 38 having other numbers of recesses may also be used.

Each recess 40 corresponds to an operating position of the transport elements 36. The transport elements 36 may be placed in different recesses 40 corresponding to different operating positions, as required, depending on the size, shape, and material, for example, of the items being transported. Thus, placing the transport elements 36 in the innermost operating position provides the narrowest transport path. Such a narrow transport path may be suitable for postcards or media items, such as CDs and/or DVDs, for example. An embodiment of the adjustable item transport 12 with the belts in the innermost position is shown in FIG. 2. A view of the underside of the same embodiment is shown in FIG. 4.

Alternatively, placing the transport elements 36 in the outermost operating position provides the widest transport path. Such a wide transport path may be suitable for large envelopes or magazines, for example. An embodiment of the adjustable item transport 12 with the belts in the outermost position is shown in FIG. 5.

Figure 4:
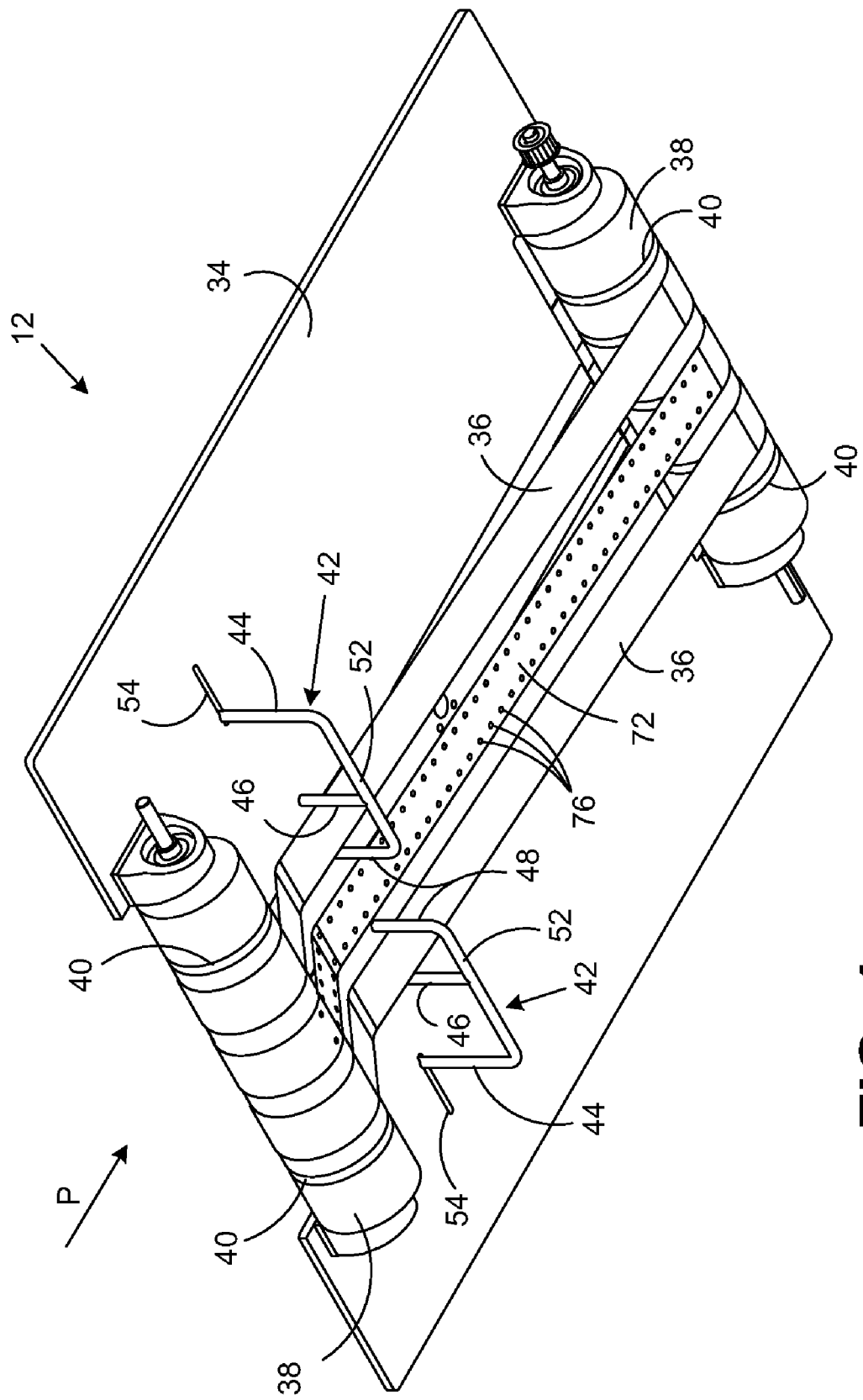
FIG. 4 is a perspective view of the underside of the adjustable item transport shown in FIG. 2.
Figure 5:
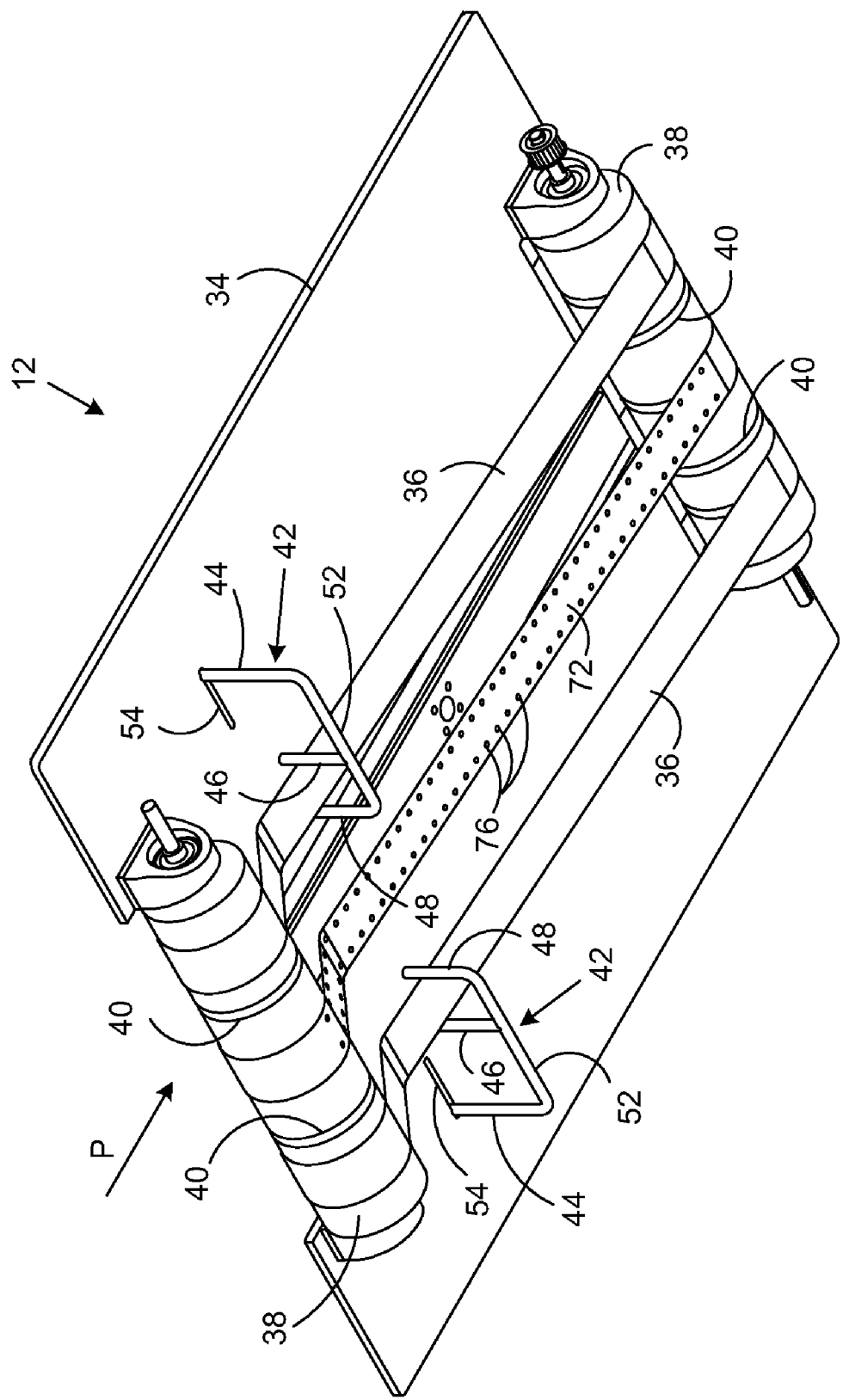
FIG. 5 is a perspective view of the underside of the adjustable item transport shown in FIG. 2 in an alternative configuration.

The adjustable item transport 12 further comprises an adjustment member 42, shown in FIGS. 4 and 5. The adjustment member 42 comprises a handle portion 44, a first guide portion 46 adjacent to a first edge of the transport element 36, and a second guide portion 48 adjacent to a second edge of the transport element 36. In one embodiment, the adjustment member 42 comprises a stainless steel rod. Other materials may also be used. As discussed below, the adjustment member is selectively lockable with respect to the deck.

Movement of the handle portion 44 substantially perpendicular to the transport path P engages one of the first guide portion 46 and the second guide portion 48 with a respective edge of the transport element 36 to move the transport element between recesses 40 in the support element 38 to change the operating position of the transport element 36. Thus, movement of the adjustment members 42 towards the center of the deck 34 will engage the first guide portions 46 with the outer edges of the respective transport elements 36 and will move the transport elements 36 to the innermost operating position to provide the narrowest transport path.

Conversely, movement of the adjustment members 42 towards the outer edge of the deck 34 will engage the second guide portions 48 with the inner edges of the respective transport elements 36 and will move the transport elements 36 to the outermost operating position to provide the widest transport path.

In one embodiment, the adjustment member 42 is actuated to change the operating position of the transport element 36 while the transport element is moving around the support elements 38.

As shown in FIGS. 2-5, a first end 50 of the handle portion 44 is disposed above the deck 34 and a second end 52 of the handle portion 44 is disposed below the deck 34. The first end 50 of the handle portion 44 passes through an opening 54, such as a slot, for example, in the deck 34. The handle portion 44 may be provided with a stop (not shown), such as a nut or a spacer, for example, to retain the first end 50 of the handle portion 44 above the deck 34. The first guide portion 46 and the second guide portion 48 are disposed on the second end 52 of the handle portion 44.

The adjustable item transport 12 further comprises a guide member 58 for guiding the items being transported along the transport path P. The guide member 58 comprises a base 60 removably disposed on the handle portion 44 and a deflector element 62 disposed on the base 60 for engaging edges of the items. In the illustrated embodiment, the base 60 and the deflector element 62 are formed as separate components and connected with a fastener. Alternatively, the base 60 and the deflector element 62 may be formed as a unitary part.

The first end 50 of the handle portion 44 is received in an opening 64 in the base 60. In the illustrated embodiment, the opening 64 in the base 60 comprises a slot. The opening 64 receives the first end 50 of the handle portion 44 and may allow the guide member 58 to be adjusted over a wide range of positions in the direction substantially perpendicular to the transport path P. By adjusting the pair of guide members 58, the spacing between the guide members 58 may be modified to accommodate items having different widths. In addition, each guide member 58 may be adjusted independently of the associated adjustment member 42.

In the illustrated embodiment, the upstream ends of the deflector elements 62 are flared outwardly to receive incoming items and guide them along the transport path P.

The illustrated adjustable item transport 12 further comprises a locking element 70 for selectively locking the first end 50 of the handle portion 44 and the base 60 with respect to the deck 34. As shown, the locking element 70 comprises a manual, releasable locking element, such as a thumb screw, for example, received on the threaded first end 50 of the handle portion 44. Other arrangements for selectively locking the components may also be used.

Embodiments of the adjustable item transport 12 further comprise a vacuum transport element 72 for operating in association with the transport elements 36 to transport the items along the deck 34 on the transport path P. As shown in FIGS. 2, 4, and 5, the vacuum transport element 72 is arranged between the two transport elements 36.

In one embodiment, the vacuum transport element 72 comprises a belt disposed adjacent to a vacuum plenum (not shown). The vacuum transport element 72 is provided with openings 76 that are in fluid communication with the vacuum plenum, which provides a suction force to secure items being transported on the transport path P. Other numbers and arrangements of vacuum transport elements may also be used.

In one example of the operation of the adjustable item transport 12 according to the invention, the operating positions of the transport elements 36 and the spacing of the guide members 58 are set prior to transporting items.

In particular, the motor/controller arrangement (not shown) is started to drive one or more of the support elements 38, which starts the transport elements 36 in motion. Next, the locking elements 70 are moved to an unlocked position.

While the transport elements 36 are being driven, the adjustment members 42 are moved in a direction substantially perpendicular to the transport path P (inwardly or outwardly) to move the transport elements 36 between recesses 40 in the support elements 38 to change the operating position of the transport elements 36. As discussed above, the operating position may be based on various features of the items being transported, including size, shape, wrapping material, etc.

Next, the bases 60 of the guide members 58 are positioned on the first ends 50 of the respective handle portions 44 so that the deflector elements 62 are appropriately positioned for the items being transported.

When the transport elements 62 and the guide members 58 are in the desired locations, the locking elements 70 are moved to the locked position to lock the first end 50 of the handle portion 44 and the base 60 with respect to the deck 34. The transport elements 36 and the guide members 58 subsequently may be independently adjusted, as desired.

The adjustable item transport 12 of the present invention may allow an operator to safely adjust the operating position of the transport elements 36 of the transport from a position above the deck 34. In addition, the adjustable item transport 12 may provide increased operating efficiency due to the ability to adjust various aspects of the device while the transport is being operated.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. An adjustable item transport, comprising:
   a deck for supporting items;
   a transport element for transporting the items along the deck on a transport path;
   a plurality of support elements rotatably supporting the transport element, each support element comprising a plurality of recesses configured to receive the transport element, wherein each recess corresponds to an operating position of the transport element; and
   an adjustment member disposed in combination with the deck and operative to displace the transport element relative to the support elements, comprising:
   a handle portion;
   a first guide portion adjacent to a first edge of the transport element; and
   a second guide portion adjacent to a second edge of the transport element,
   wherein movement of the handle portion substantially perpendicular to the transport path engages one of the first guide portion and the second guide portion with a respective edge of the transport element to move the transport element between recesses in the support element to change the operating position of the transport element.

2. The transport of claim 1, wherein the adjustment member is selectively lockable with respect to the deck.

3. The transport of claim 1, wherein a first end of the handle portion is disposed above the deck and a second end of the handle portion is disposed below the deck.

4. The transport of claim 3, wherein the first guide portion and the second guide portion are disposed on the second end of the handle portion.

5. The transport of claim 3, further comprising a guide member for guiding the items being transported along the transport path, the guide member comprising:
a base removably disposed on the handle portion; and
a deflector element disposed on the base for engaging edges of the items.

6. The transport of claim 5, wherein the first end of the handle portion is received in an opening in the base.

7. The transport of claim 6, wherein the opening comprises a slot.

8. The transport of claim 6, wherein the guide member is adjustable in a direction substantially perpendicular to the transport path.

9. The transport of claim 6, further comprising a locking element for selectively locking the first end of the handle portion and the base with respect to the deck.

10. The transport of claim 1, further comprising a vacuum transport element for operating in association with the transport element to transport the items along the deck on the transport path.

11. An adjustable item transport, comprising:
a deck for supporting items;
a plurality of transport elements for transporting the items along the deck on a transport path;
a plurality of support elements rotatably supporting each of the transport elements, each support element comprising a plurality of recesses configured to receive a respective transport element, wherein each recess corresponds to an operating position of the respective transport element; and
an adjustment member disposed in combination with the deck and associated with each of the transport elements, the adjustment member operative to displace the transport element relative to the support elements and comprising:
a handle portion;
a first guide portion adjacent to a first edge of the respective transport element; and
a second guide portion adjacent to a second edge of the respective transport element,
wherein movement of the handle portion substantially perpendicular to the transport path engages one of the first guide portion and the second guide portion with a respective edge of the respective transport element to move the respective transport element between recesses in the support element to change the operating position of the transport element.

12. The transport of claim 11, further comprising:
a guide member associated with each transport element for guiding the items being transported along the transport path, each guide member comprising:
a base removably disposed on the respective handle portion; and
a deflector element disposed on the base for engaging edges of the items;
a locking element for selectively locking the first end of the respective handle portion and the base with respect to the deck; and
a vacuum transport element for operating in association with the transport elements to transport the items along the deck on the transport path.

* * * * *